(12) United States Patent
Sasaki et al.

(10) Patent No.: US 8,997,619 B2
(45) Date of Patent: Apr. 7, 2015

(54) GLASS CUTTING MACHINE, GLASS CUTTER, AND GLASS CUTTING METHOD

(75) Inventors: Susumu Sasaki, Chiba (JP); Katsunori Kuwaki, Mobara (JP); Makoto Tatemura, Ichinomiya (JP); Hiroyuki Tani, Sakura (JP); Hitoshi Azuma, Yokohama (JP); Tomio Yaguchi, Sagamihara (JP); Tatsuo Hamamoto, Mobara (JP); Hideaki Ishige, Sammu (JP); Shuji Iwasaki, Chosei (JP); Katsuyuu Takahashi, Mobara (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 470 days.

(21) Appl. No.: 13/167,118

(22) Filed: Jun. 23, 2011

(65) Prior Publication Data

US 2011/0314990 A1    Dec. 29, 2011

(30) Foreign Application Priority Data

Jun. 23, 2010    (JP) ................................. 2010-142876

(51) Int. Cl.
*B26D 3/08*    (2006.01)
*C03B 33/10*    (2006.01)
(52) U.S. Cl.
CPC ............... *C03B 33/10* (2013.01); *C03B 33/107* (2013.01)
(58) Field of Classification Search
USPC .......................................... 83/879–887, 676
See application file for complete search history.

(56) References Cited

U.S. PATENT DOCUMENTS

| | | | |
|---|---|---|---|
| 3,106,018 A | | 6/1960 | Judd, Jr. |
| 3,699,596 A | * | 10/1972 | Lyon ................................ 412/13 |
| 4,401,001 A | * | 8/1983 | Gerber et al. ................... 83/451 |
| 5,924,618 A | * | 7/1999 | Doak ............................... 225/96 |
| 7,059,227 B2 | * | 6/2006 | Mori et al. ....................... 83/451 |
| 7,234,383 B2 | * | 6/2007 | Soyama ........................... 83/884 |
| 7,762,171 B2 | * | 7/2010 | Soyama ........................... 83/884 |
| 7,814,819 B2 | * | 10/2010 | Soyama ........................... 83/884 |
| 2003/0041709 A1 | * | 3/2003 | Jones ............................... 83/13 |
| 2005/0098014 A1 | * | 5/2005 | Soyama ..................... 83/698.41 |

(Continued)

FOREIGN PATENT DOCUMENTS

| | | |
|---|---|---|
| JP | 2001-246616 | 9/2001 |
| JP | 2004-2129 | 1/2004 |

(Continued)

OTHER PUBLICATIONS

Toshihiko Ono et al., Cuttability of AMLCD Glass Substrates, SID 02 Digest, pp. 45-47.

(Continued)

*Primary Examiner* — Omar Flores Sanchez
(74) *Attorney, Agent, or Firm* — Lowe Hauptman & Ham, LLP

(57) ABSTRACT

A glass cutter is provided which can form, using a wheel, a uniform crack in glass even when a projection or an earlier-formed scribe line is present on the glass. When the wheel is moved on the glass, a fracture layer is formed causing a rib mark to be formed below the fracture layer and a crack to be formed below the rib mark. To cut the glass, the crack is required to be formed uniformly. Applying a force to resist the rotating force of the wheel makes it possible to form a uniform crack even when a projection is present on the glass. This improves glass cutting yield.

8 Claims, 15 Drawing Sheets

(56) References Cited

U.S. PATENT DOCUMENTS

| | | | |
|---|---|---|---|
| 2007/0131077 A1* | 6/2007 | Kim .............................. | 83/886 |
| 2009/0078105 A1 | 3/2009 | Maekawa et al. | |
| 2011/0113945 A1* | 5/2011 | Maekawa et al. ............... | 83/886 |
| 2011/0132954 A1* | 6/2011 | Tomei et al. ...................... | 225/2 |
| 2012/0210842 A1* | 8/2012 | Brackley et al. ................ | 83/880 |

FOREIGN PATENT DOCUMENTS

| | | |
|---|---|---|
| JP | 2007-175997 | 7/2007 |
| JP | 2009-93051 | 4/2009 |
| SU | 958347 | 9/1982 |
| WO | WO 2006/097684 | 9/2006 |
| WO | WO 2007/004700 A1 | 1/2007 |

OTHER PUBLICATIONS

T. Murata et al., Suitable Scribing Conditions for AMLCD Glass Substrates, SID 03 Digest, pp. 374-377.
Extended European Search Report dated Aug. 16, 2013, including European Search Report and European Search Opinion, for EP Application No. 11171049.7-1355/2399874.
English machine translation of JP 10-231134.

\* cited by examiner

GLASS CUTTING MACHINE, GLASS CUTTER, AND GLASS CUTTING METHOD

CLAIM OF PRIORITY

The present application claims priority from Japanese Patent Application JP 2010-142876 filed on Jun. 23, 2010, the content of which is hereby incorporated by reference into this application.

FIELD OF THE INVENTION

The present invention relates to technology which, when separating, for example, liquid crystal display (LCD) panels from a mother substrate by scribing, enables vertical cracks to be formed stably to achieve stable scribing.

BACKGROUND OF THE INVENTION

In LCD panel production, to improve production efficiency, plural LCD panels are formed on a large mother panel, then they are separated from the mother panel by scribing. Generally, for glass cutting, a wheel made of, for example, sintered diamond or cemented carbide with a diameter of several millimeters is used. The wheel has a circumferential edge and is moved on a glass surface while applying a certain pressure to the glass surface. The wheel moves on the glass surface cutting into the glass by several micrometers thereby forming a linear score measuring several micrometers both in depth and in width. Such a linear score may hereinafter be referred to as a "fracture layer."

At the same time as the linear score is formed, a crack with a depth vertical to the glass surface of several tens of micrometers to several hundred micrometers is formed immediately below the linear score. The formation of such a vertical crack propagates, as the wheel advances, ahead of the advancing wheel position with a front angle of several degrees with respect to the vertical direction extending right below the wheel. That the formation of the vertical crack propagates with such an angle can be known by observing a mark called a rib mark which is generated on the cut surface of the glass. The depth of the vertical crack is the depth of the rib mark plus the depth of a crack formed to further extend depthwise beyond the rib mark. As far as the present invention is concerned, the rib mark depth and the depth of the vertical crack may be regarded, for the sake of convenience, as being identical. Generally, the operation and what is caused by the operation described above are collectively referred to as scribing. To separate a sheet of glass into multiple parts, one side of a sheet of glass is scribed, and the scribed portion is pressed from the other side causing the vertical crack formed in the scribed portion to extend deeper. This glass separation may be referred to as breaking.

FIG. 22 shows a glass cutter 1. As shown, the glass cutter 1 includes a wheel 10 used for scribing, a wheel pin 11 serving as a shaft of the wheel 10, and a holder 12 supporting the wheel 10 and the wheel pin 11.

FIG. 23 is a sectional view of the wheel 10 used for scribing. Referring to FIG. 23, the wheel 10 has a ridge, i.e. a cutting edge 101, bevels 102, and sides 103. The wheel 10 has thickness t ranging from 0.5 to 1.0 mm, edge angle θ ranging from 100 to 130 degrees, and diameter d ranging from 2 to 3 mm. The wheel 10 is formed of, for example, sintered diamond or cemented carbide.

FIGS. 24A and 24B are a plan view and a sectional view, respectively, showing scribing of glass performed using the wheel 10 shown in FIG. 23. Referring to FIG. 24A, a fracture layer 201 formed by the wheel 10 has width w which is about several micrometers.

Referring to FIG. 24B, the fracture layer 201 formed by the wheel 10 has depth d1, and a rib mark 202 is formed below the fracture layer 201 with a crack 203 further extending from the rib mark 202. Depth d1 of the fracture layer 201 is several micrometers. Depth d2 from the glass surface to the bottom of the crack ranges from several tens of micrometers to several hundred micrometers.

In FIG. 24B, a white arrow MD denotes the moving direction of the wheel 10, "FF" denotes a force moving the wheel 10, and "RF" denotes a rotating force generated as the wheel 10 moves. Also, "F1" denotes a force the wheel 10 applies, in its moving direction, to the glass 300; "F2" denotes a force the wheel 10 vertically applies to the glass 300; and "F3" denotes a resultant force of F1 and F2. As the wheel 10 moves, while rotating, in the direction MD, the crack 203 is formed in the glass 300.

The above glass cutting mechanism is described, for example, in literature by Toshihiko Ono and Yuko Ishida, "Cuttability of AMLCD Glass Substrate" in SID 02 DIGEST, pages 45-47 (2002) and also in literature by T. Murata, S. Miwa, H. Yamazaki, S. Yamamoto, "Suitable Scribing Conditions for AMLCD Glass Substrate" in SID Digest, pages 374-377. Also, a configuration for stably forming a crack when forming a scribe line crossing an existing scribe line on a glass surface is described, for example, in Japanese Patent Laid-Open No. 2009-93051. Furthermore, a wheel 10 with notches formed on its cutting edge so that it may securely rotate on the glass surface is described in WO2007/004700. Still furthermore, a configuration in which a wheel 10 and a rotary shaft for rotating the wheel 10 are united is described in Japanese Patent Laid-Open No. 2001-246616.

SUMMARY OF THE INVENTION

FIGS. 25A to 25D show operation of the wheel 10 in a case where a microprojection (hereinafter also referred to simply as a "projection") 301 is present on the surface of the glass 300. FIG. 25A shows the wheel 10 moving on a flat surface portion of the glass 300. In FIG. 25B, the wheel 10 is shown having ridden on the projection 301 present on the glass 300. In the state shown in FIG. 25B with the wheel 10 over the projection 301, the wheel 10 applies, in its moving direction, no force to the glass 300. In this state, the force applied from the wheel 10 to the glass 300 is F2 only. As a result, formation of the crack 203 that has been continued until before the wheel 10 has ridden on the projection 301 is once discontinued.

FIG. 25C shows the wheel 10 that is, having passed the projection 301, about to start moving on a flat surface portion of the glass 300 again. As shown in FIG. 25C, the wheel 10, after passing the projection 301, starts applying forces F1, F2, and F3 to the glass 300 again to cause formation of the crack 203 to be resumed. FIG. 25D shows a state in which the wheel 10 passed the projection 301 and the crack 203 is formed in the glass 300 in a normal manner.

FIGS. 25C and 25D show that no crack 203 is formed in portion Y below the projection 301 present on the glass surface. Thus, with the glass 300 having a portion where the crack 203 required for subsequent glass breaking operation is not formed, there is a large risk that the portion causes, by preventing the glass 300 from being stably broken into plural parts, generation of defective parts in the subsequent glass breaking operation. This problem cannot be adequately dealt with by the configurations described in Japanese Patent Laid-Open No. 2009-93051 and WO2007/004700.

In many cases of LCD cell cutting, particularly, where plural LCD cells are cut out from a single LCD sheet, first, plural first scribe lines are formed on the LCD sheet, then plural second scribe lines are formed perpendicularly to the first scribe lines, so that the first scribe lines and the second scribe lines have intersections where they cross.

When a second scribe line is formed using a wheel 10 to cross a first scribe line already formed, formation of a vertical crack along the second scribe line to propagate ahead of the position of the wheel 10 may be once discontinued at the intersection of the first and second scribe lines, requiring the wheel 10 to move several hundred micrometers past the intersection before the vertical crack formation can be resumed. Namely, the vertical crack formed along the second scribe line is not formed over a range of several hundred micrometers from the intersection. Such a scribe line intersection with no vertical crack formed along the second scribe line makes glass breaking difficult and possibly causes glass edge chipping in the subsequent glass breaking operation. Such discontinuation of vertical crack formation is referred to as "intersection skipping." Intersection skipping is assumed to occur when formation of a vertical crack propagating ahead of the position of the wheel 10 is discontinued at a scribe line intersection causing the wheel 10 to temporarily ride on the glass surface thereby preventing formation of a fracture layer and, hence, preventing formation of a vertical crack.

The above process is schematically illustrated in FIGS. 26A to 26D. FIG. 26A shows the wheel 10 moving, while rotating, toward an existing scribe line 302. The crack 203 is formed in the glass 300 in the manner as described above with reference to FIGS. 25A to 25D. FIG. 26B shows a state in which formation of the crack 203 by the wheel 10 has been discontinued by the presence of the scribe line 302.

Namely, when the wheel 10 passes the scribe line 302, it enters a state similar to riding on a new glass edge. In such a state, F2 is the only force applied from the wheel 10 to the glass 300 with no force applied to the glass 300 in the moving direction of the wheel 10. As a result, formation of the crack 203 in the glass 300 is discontinued.

FIG. 26C shows a state in which, with the wheel 10 having crossed the scribe line 302, formation of a vertical crack in the glass 300 is being resumed. FIG. 26D shows a state in which the wheel 10 passed the scribe line 302 and the crack 203 is formed in the glass 300 in a normal manner.

FIGS. 26C and 26D show that no crack 203 is formed in portion Z, i.e. in the vicinity of the scribe line 302. Thus, with the glass 300 having a portion where the crack 203 required for subsequent glass breaking operation is not formed, there is a large risk that the portion causes, by preventing the glass 300 from being stably broken into plural parts, generation of defective parts in the subsequent glass breaking operation. This problem cannot be adequately dealt with by the configurations described in Japanese Patent Laid-Open No. 2009-93051 and in WO2007/004700.

An object of the present invention is to enable continuous formation of a crack and stable scribing by the wheel 10 so as to improve the yield in the process of breaking a mother substrate into plural LCD panels even in cases where there is a microprojection on the glass surface or there is a scribe line already formed on the glass surface.

According to the present invention made in view of the above problem, when moving a wheel on a glass surface while rotating the wheel, a force to oppose, as if braking, the wheel rotation is applied. This makes it possible to stably form a vertical crack on the glass surface even in cases where a microprojection is present on the glass surface. Furthermore, it is also made possible to inhibit intersection skipping which causes the crack formation to be discontinued when the wheel moves crossing an earlier-formed scribe line.

In other words, it is a principle of the present invention to restrain generation, due to rotation of a wheel, of an upward force by applying, to the wheel, a force to oppose the rotation of the wheel. Namely, the wheel is prevented from riding on a glass surface even when the glass surface includes projections, depressions, or otherwise non-flat portions or even when the wheel moves crossing an earlier-formed scribe line. In this way, it is easier for the wheel to keep applying a force, in its moving direction, to the glass in a stable manner so as to stably continue scribing.

According to the present invention, in glass cutting operation, a wheel moving on a glass surface does not ride on the glass surface even when microdepressions and microprojections are present on the glass surface. Also, the wheel is prevented from riding on the glass surface when it finishes crossing an earlier-formed scribe line. This can prevent vertical crack formation in the glass from becoming unstable or from being discontinued.

Since, in a process to scribe a mother substrate and separate LCD panels from the mother substrate, scribe lines can be continuously and stably formed, the yield of the scribe and break process can be improved. Since such a scribe and break process for separating display panels from a mother substrate is also used to manufacture organic EL display panels, the present invention can also be effectively applied to the manufacture of organic EL display panels.

DESCRIPTION OF THE PREFERRED EMBODIMENTS

Figure 1B:
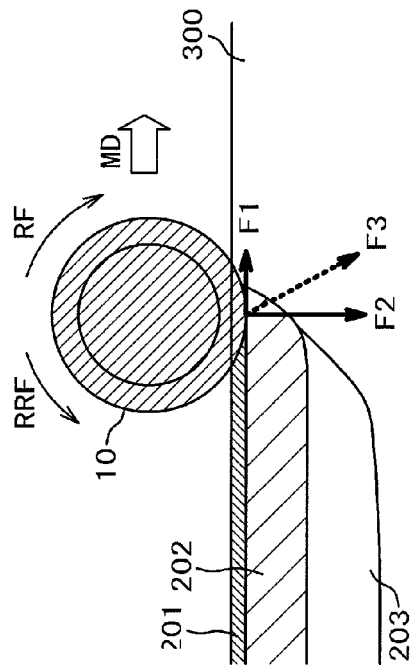
FIGS. 1A to 1D are schematic diagrams illustrating the principle of the present invention.
Figure 1D:
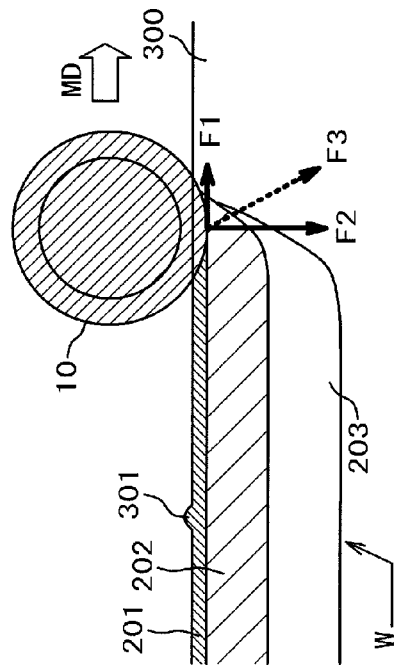
Figure 1A:
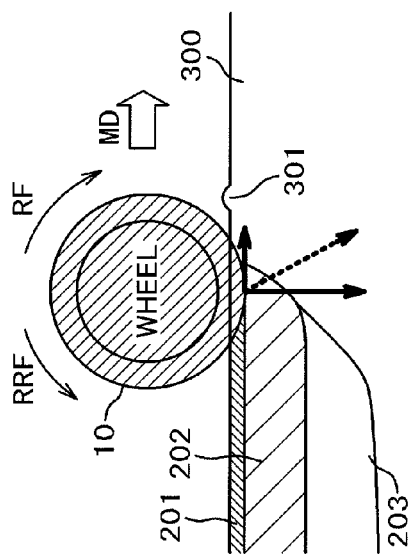

FIGS. 1A to 1D are schematic diagrams illustrating the principle of the present invention based on an example case in which a wheel 10 moves across a microprojection 301 present on a glass 300. For FIGS. 1A to 1D, description already provided in the foregoing with reference to FIGS. 25A to 25D and other drawings will be omitted. Referring to FIG. 1A showing the wheel 10 moving toward the projection 301 present on the glass surface, the wheel 10, when moving in the direction denoted by a white arrow MD, rotates with a rotating force RF. According to the present invention, a force RRF to oppose the rotating force RF is applied. Mechanisms used to generate the force RRF will be described in connection with the following embodiments. Namely, the present invention provides a configuration for braking the rotation of the wheel 10.

FIG. 1B shows the wheel 10 passing the projection 301 on the glass surface. With the force to oppose the rotation of the wheel 10 applied, the wheel 10 is prevented from riding on the projection 301. As a result, the wheel 10 is allowed to form the fracture layer 201 even where the projection 301 is present, so that the crack 203 is formed to be continuous in the glass 300. With the force RRF to oppose rotation of the wheel 10 applied, the wheel 10 cannot easily rotate where the projection 301 is present, so that the wheel 10 is caused to pass the projection 301 sliding without riding thereon. This allows the wheel 10 to continue formation of the crack 203. Note that, for the sake of simplification, the projection 301 on the glass surface is not shown in FIG. 1B.

Figure 1C:
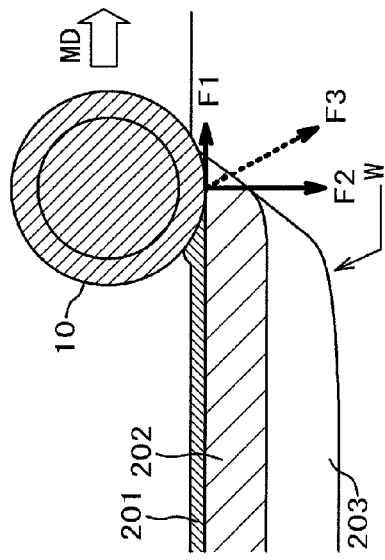

FIG. 1C shows a state in which the wheel 10 has passed the projection 301. In FIG. 1C, it is shown that a crack is formed also in portion W below the projection 301 of the glass. FIG. 1D shows a state in which the wheel 10 having passed the projection 301 is moving in the direction of arrow MD. As shown in FIG. 1D, even though the projection 301 is present on the glass surface, the crack 203 is continuously formed in the glass by the wheel 10.

Figure 2A:
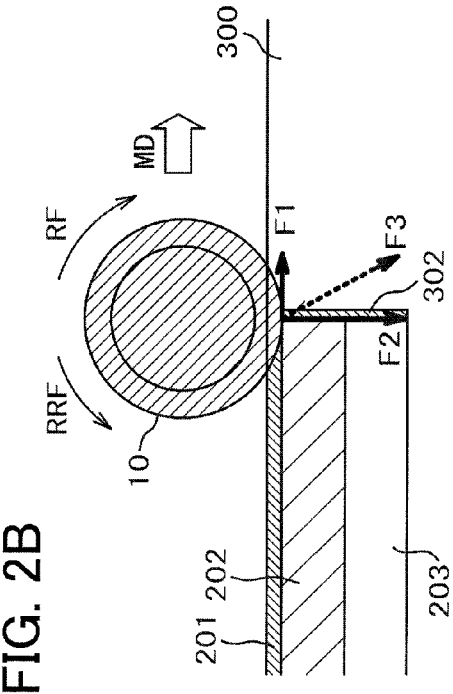
FIGS. 2A to 2D are schematic diagrams illustrating the principle of the present invention.

FIGS. 2A to 2D schematically show the wheel 10 moving across an existing scribe line 302. For FIGS. 2A to 2D, description already provided in the foregoing with reference to FIGS. 26A to 26D and other drawings will be omitted. Referring to FIG. 2A showing the wheel 10 moving toward the scribe line 302, a force RRF to oppose a rotating force RF of the wheel 10 is applied like in the case shown in FIGS. 1A to 1D.

Figure 2B:
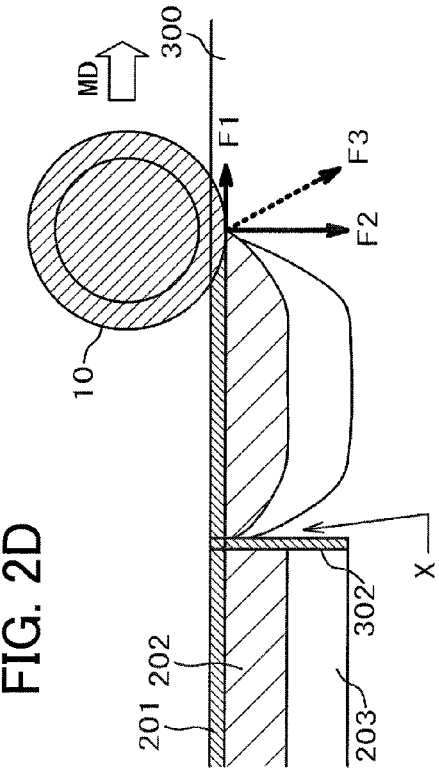
Figure 2C:
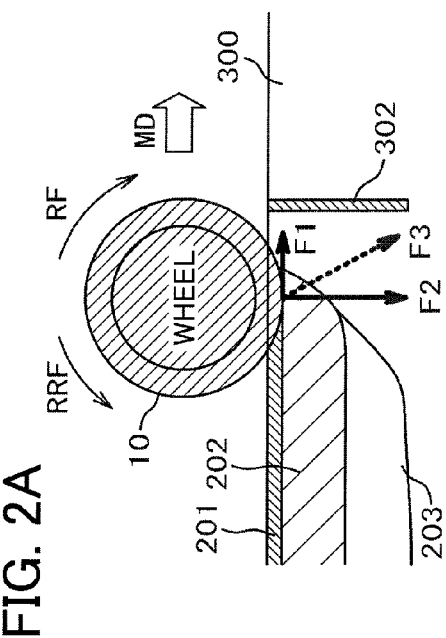

Referring to FIG. 2B, when the wheel 10 reaches the scribe line 302, a crack 203 formed by the wheel 10 is discontinued. FIG. 2C shows that, immediately after the wheel 10 passes the scribe line 302, formation of a crack starts. Namely, with the force RRF to oppose rotation of the wheel 10 applied, the wheel 10 does not ride on the surface of the glass 300 even when crossing the scribe line 302, so that it can continuously form a fracture layer 201, a rib mark 202, and a crack 203.

Figure 2D:
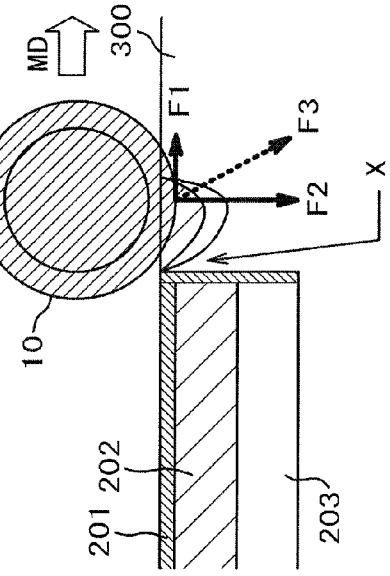

FIG. 2D shows the wheel 10 further moving in the direction of arrow MD after crossing the scribe line 302. FIGS. 2C and 2D show that formation of the fracture layer 201, rib mark 202 and crack 203 is started in portion X immediately after the wheel 10 passes the scribe line.

As described above, according to the present invention, the crack 203 can be formed in a stable manner even when the wheel 10 passes the projection 301 present on the glass surface or the existing scribe line 302. Thus, plural parts such as LCD panels can be separated from a mother substrate in a stable manner. The effects similar to those described above can also be obtained by applying the present invention to cases in which organic EL display panels are separated from a mother substrate.

The concrete configuration of the present invention will be described in the following based on embodiments. For each embodiment, a glass cutter 1 according to the present invention will be described. Each embodiment provides a configuration for generating a force to oppose rotation of a wheel 10 included in the glass cutter 1.

First Embodiment

Figure 3:
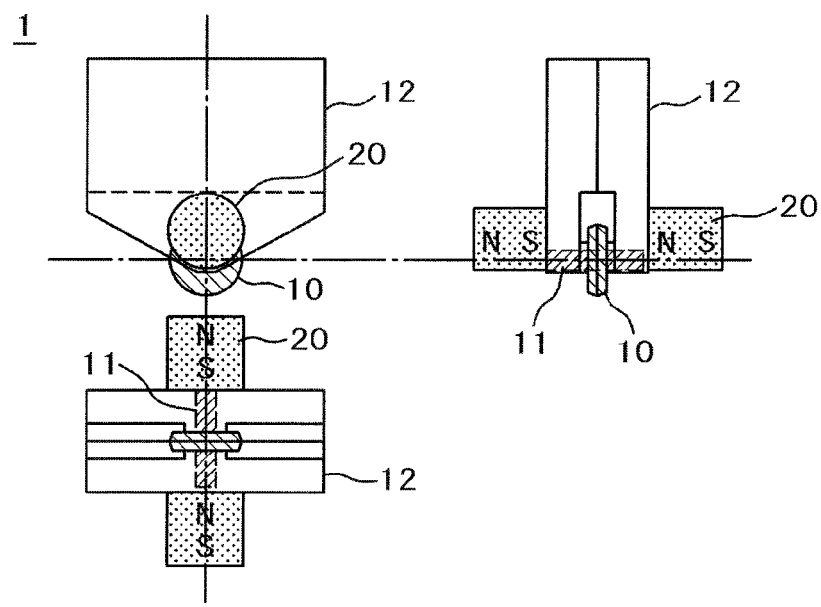
FIG. 3 is a diagram illustrating a first embodiment of the present invention.

FIG. 3 shows the glass cutter 1 of the first embodiment. As shown, the wheel 10 is supported by a wheel pin 11 and the wheel pin 11 is supported by a holder 12. The wheel 10 is formed of sintered diamond added to by Co which is a magnetic material, so that the wheel 10 as a whole is a magnetic body. The holder 12 is formed of tool steel which is an ultrahard material, so that it is a magnetic body. Two magnets 20 are provided on outsides of the holder 12. The magnets 20 generate a magnetic field of a prescribed magnetic flux density and, by having the magnetic field crossed by the wheel 10, applies a force to press the wheel 10 against a side of the holder 12. Pressing the wheel 10 against a side of the holder 12 generates a force RRF to oppose the rotating force RF of the wheel 10, so that a fracture layer and a crack can be formed in the glass in a stable manner.

Referring to FIG. 3, the magnets 20 sandwiching the holder 12 are disposed with the north pole of one of them facing the south pole of the other. According to the present embodiment, the magnets 20 each have a diameter of about 4 mm and a thickness of about 5 to 7 mm. The magnets 20 are most preferably made of neodymium-family material which is mechanically strong. Besides neodymium magnets, samarium-cobalt magnets which can generate strong magnetic fields may also be used as the magnets 20.

As shown in FIG. 3, the magnets 20 and the wheel 10 are not concentric. Therefore, when the wheel 10 rotates, it crosses a magnetic field with an uneven magnetic flux density. The wheel 10 containing a Co additive is conductive. When, in this configuration, the wheel 10 rotates, an eddy current is generated in the wheel 10. The eddy current generates a force to oppose rotation of the wheel 10. This results in allowing the wheel 10 to form a fracture layer and a crack in the glass in a stable manner. Thus, the wheel 10 can perform scribing in a stable manner.

Second Embodiment

Figure 4:
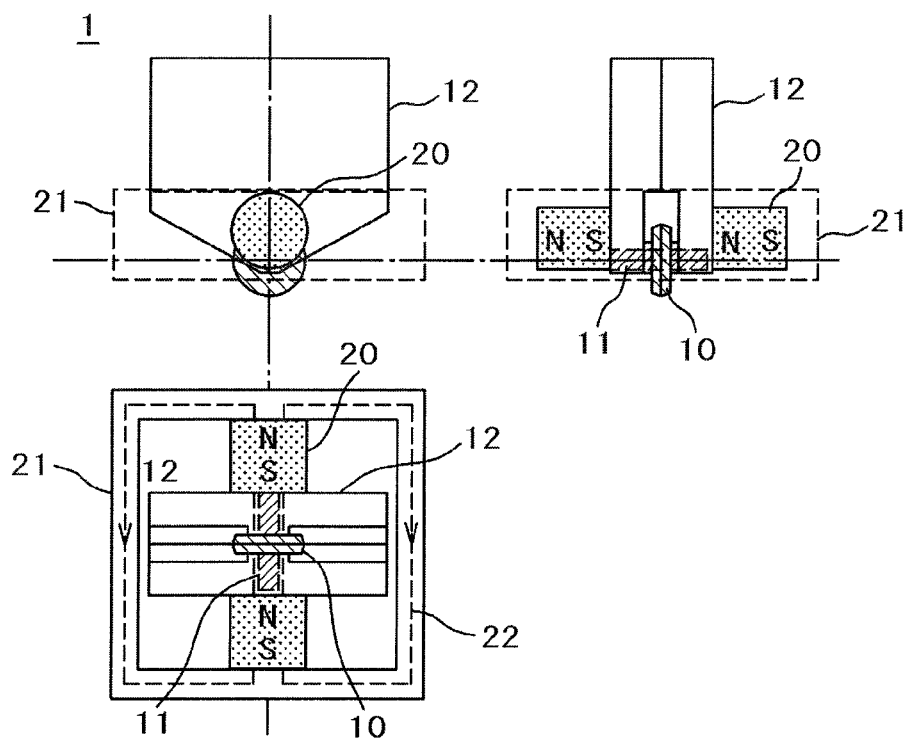
FIG. 4 is a diagram illustrating a second embodiment of the present invention.

FIG. 4 is a diagram showing a second embodiment of the present invention. The wheel 10, wheel pin 11, holder 12, and magnets 20 shown in FIG. 4 are basically identical with those shown in FIG. 3. In the configuration shown in FIG. 4, the holder 12 and the magnets 20 are surrounded by a magnetic frame 21 with a high magnetic permeability with the magnetic frame 21 providing magnetic paths. In FIG. 4, broken-line arrows shown on the magnetic frame 21 represent a magnetic flux. With magnetic paths formed in the magnetic frame 21, reluctance is reduced, so that the magnetic flux to flow through the wheel 10 becomes larger. This increases the force to oppose rotation of the wheel 10.

Since the magnetic flux passing through the wheel 10 becomes larger, the eddy current generated by the rotation of the wheel 10 becomes larger, so that the force generated by the eddy current to oppose rotation of the wheel 10 also becomes larger. The magnetic frame 21 is made of, for example, permalloy which has a high magnetic permeability. The magnetic frame 21 is, for example, squarely shaped measuring 15 mm in length of each side and 1 mm by 4 to 5 mm in cross-sectional area.

Third Embodiment

Figure 5:
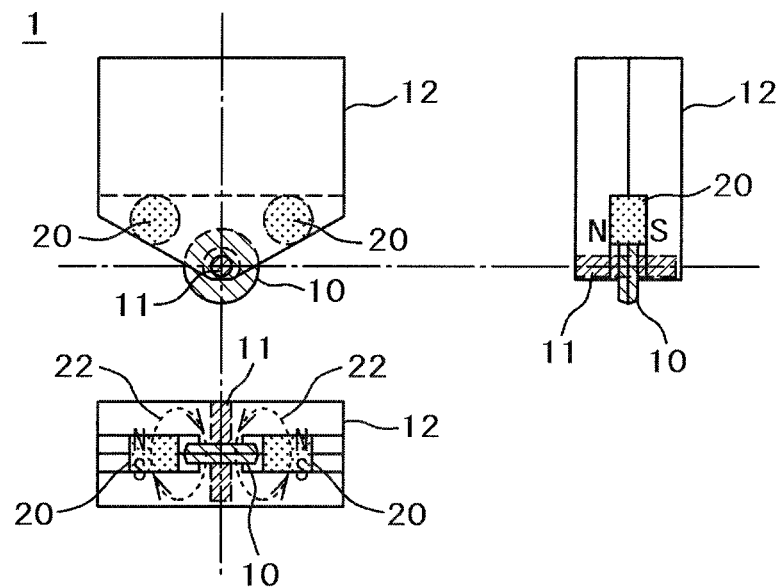
FIG. 5 is a diagram illustrating a third embodiment of the present invention.

FIG. 5 is a diagram showing a third embodiment of the present invention. As shown in FIG. 5, the magnets 20 are embedded in a gap inside the holder 12. The magnets 20 of the third embodiment each measure 3 mm in diameter and 1.5 mm in thickness. Even though, the magnets 20 of the third embodiment are smaller than those of the first and second embodiments, the magnets 20 are disposed closer to the wheel 10 in the third embodiment than in the first and second embodiments, so that a magnetic flux required to be crossed by the wheel 10 can be secured. Referring to FIG. 5, the magnetic poles of the magnets 20 are arranged along the thickness direction of the holder 12 with the north and south poles oriented identically between the two magnets. This secures a magnetic flux perpendicular to the side surfaces of the wheel 10.

In the present embodiment, too, a force to press the wheel 10 against the holder 12 so as to oppose rotation of the wheel 10 can be generated by a magnetic field. As shown in FIG. 5, the magnetic flux is concentrated in an upper portion of the wheel 10, so that the magnetic flux crossing the wheel 10 is uneven. Therefore, rotation of the wheel 10 generates an eddy current which also generates a force to oppose rotation of the wheel 10.

Fourth Embodiment

Figure 6:
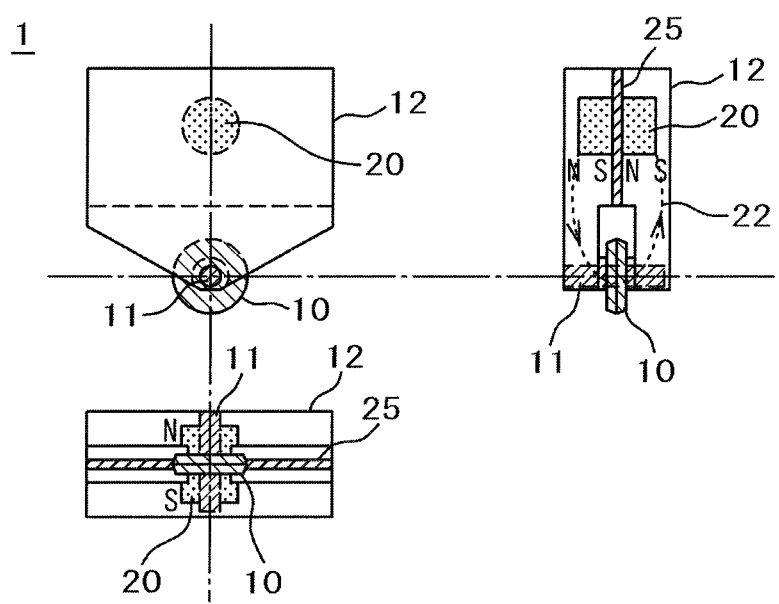
FIG. 6 is a diagram illustrating a fourth embodiment of the present invention.

FIG. 6 is a diagram showing a fourth embodiment of the present invention. As shown in FIG. 6, the holder 12 is divided in two parts with each part holding an embedded magnet 20. Namely, at least a portion of the region between the two holder parts includes the magnets 20. The holder 12 need not necessarily include plural magnets, it may include only one magnet. When plural magnets 20 are used, they are arranged such that, between them, unlike poles mutually face. A force to press the wheel 10 against the holder 12 is generated by supplying a leakage flux from the magnets 20 to the wheel 10.

In the above configuration, the holder 12 formed of tool steel which is a magnetic material allows a prescribed amount of magnetic flux to pass therethrough. Referring to FIG. 6, in the region not occupied by the magnets 20 between the two holder parts, a nonmagnetic spacer 25 is fitted. The nonmagnetic spacer 25 is, for example, about 1 mm thick. The presence of the nonmagnetic spacer 25 increases the amount of the magnetic flux reaching the wheel 10 so as to press the wheel 10 against the holder 12 by a larger force. Thus, a force to oppose rotation of the wheel 10 can be generated.

In the present embodiment, too, the flux to pass through the wheel 10 is uneven. Therefore, rotation of the wheel 10 generates an eddy current which also generates a force to oppose rotation of the wheel 10.

Fifth Embodiment

Figure 7:
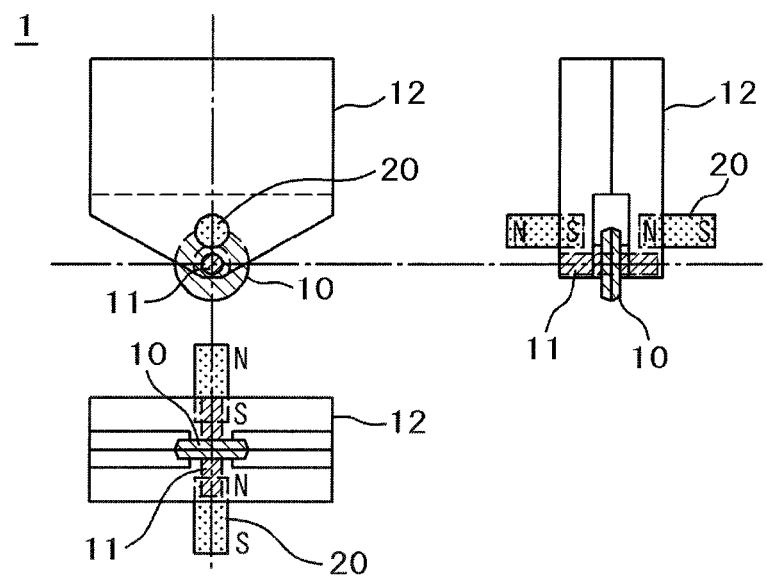
FIG. 7 is a diagram illustrating a fifth embodiment of the present invention.

FIG. 7 is a diagram showing a fifth embodiment of the present invention. As shown in FIG. 7, the magnets 20 are partly embedded in the holder 12 with their unlike poles facing each other. By being partly embedded in the holder 12, the magnets 20 are positioned closer to the wheel 10, so that the amount of the magnetic flux to pass through the wheel 10 is increased. This makes the force generated by the magnetic field to press the wheel 10 against the holder 12 larger, so that the force to oppose rotation of the wheel 10 becomes larger.

In the present embodiment, too, the flux to pass through the wheel 10 is uneven. Therefore, rotation of the wheel 10 generates an eddy current which also generates a force to oppose rotation of the wheel 10.

Sixth Embodiment

Figure 8:
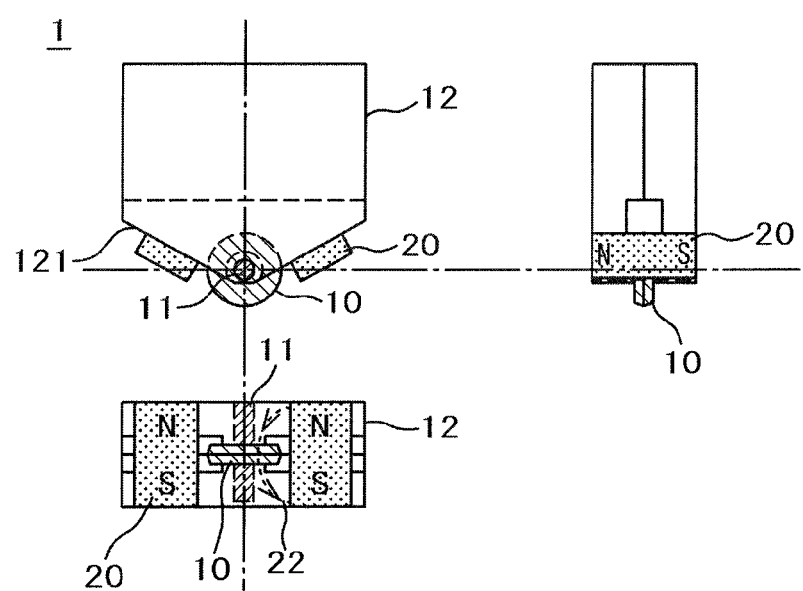
FIG. 8 is a diagram illustrating a sixth embodiment of the present invention.

FIG. 8 is a diagram showing a sixth embodiment of the present invention. As shown in FIG. 8, the magnets 20 are each disposed on a tilted surface 121 of the holder 12. The two magnets 20 are arranged in parallel with their magnetic poles oriented identically. According to the configuration of the present embodiment, the magnets 20 can be disposed closely to the wheel 10 using the holder 12 as it is without any modification, so that a desired magnetic flux can be easily made to pass through the wheel 10. Hence, a force to oppose rotation of the wheel 10 can be easily generated. In the present embodiment, too, a force to oppose rotation of the wheel 10 can also be generated by an eddy current.

Seventh Embodiment

Figure 9:
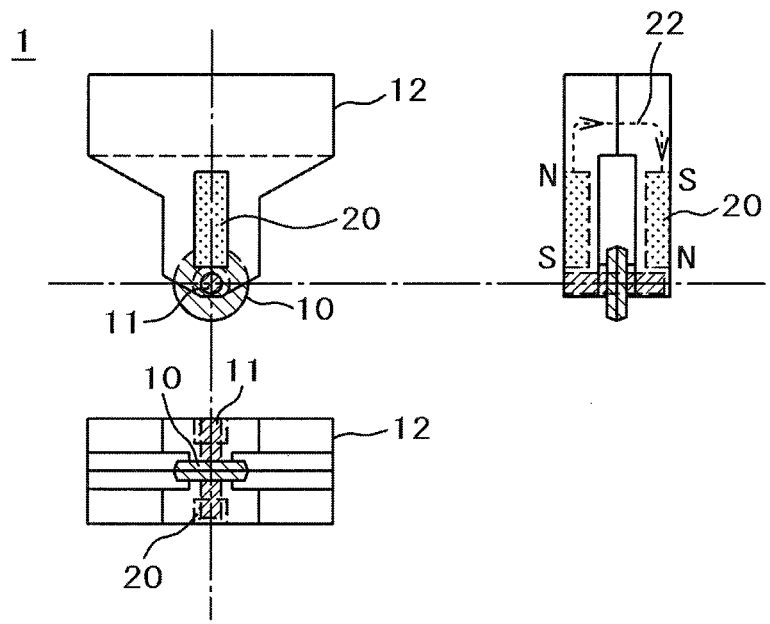
FIG. 9 is a diagram illustrating a seventh embodiment of the present invention.

FIG. 9 is a diagram showing a seventh embodiment of the present invention. As shown in FIG. 9, the magnets 20 are embedded in the holder 12. The two magnets 20 are arranged in parallel with their unlike poles facing each other. In the present embodiment unlike in the first to sixth embodiments, the portion where the magnets 20 are embedded of the holder 12 is smaller in width than the other portion thereof. This allows a magnetic flux from the magnets 20 to pass through the wheel 10 efficiently. Hence, a force to press the wheel 10 against the holder 12 so as to oppose rotation of the wheel 10 can be generated efficiently. In the present embodiment, too, a force to oppose rotation of the wheel 10 can also be generated by an eddy current.

Eighth Embodiment

Figure 10:
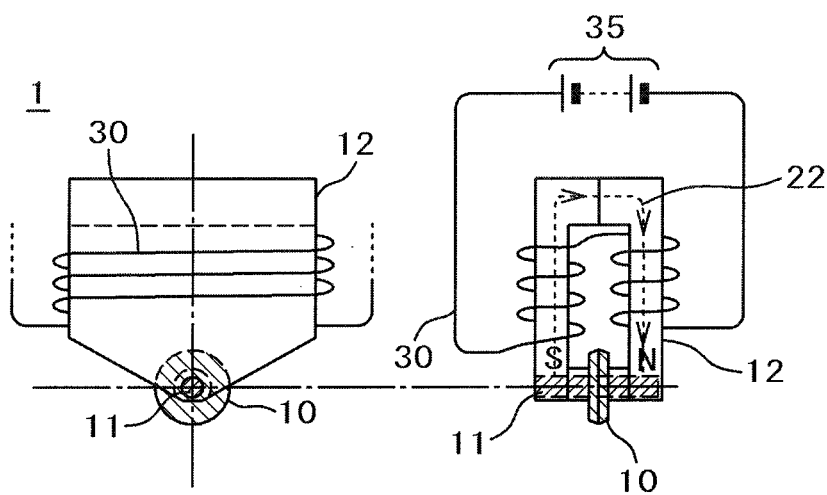
FIG. 10 is a diagram illustrating an eighth embodiment of the present invention.

FIG. 10 is a diagram showing an eighth embodiment of the present invention. In the eighth embodiment unlike in the first to seventh embodiments, a magnetic flux to pass through the wheel 10 is generated using an electromagnet. As shown in FIG. 10, the holder 12 is wound with a coil 30. A required magnetic flux can be made to pass through the wheel 10 by applying an appropriate electric current to the coil 30. Like in the first to seventh embodiments, the magnetic flux generates a force to press the wheel 10 against the holder 12 so as to oppose rotation of the wheel 10.

Referring to FIG. 10, with a current applied to the coil 30, the holder 12 serves as a horseshoe-shaped magnet. According to the present embodiment, a required magnetic flux is generated by the electromagnet, so that the magnetic flux can be controlled easily. Hence, the glass cutter 1 can be used to scribe various kinds of mother substrates.

Ninth Embodiment

Figure 11:
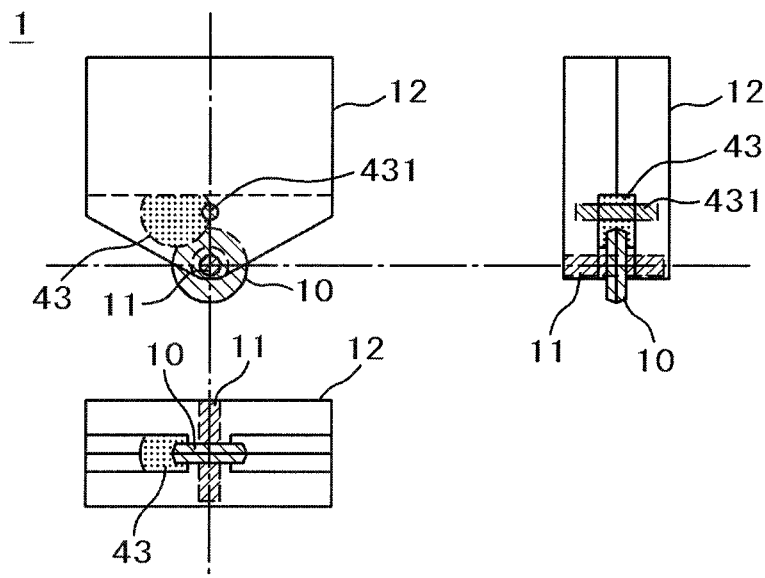
FIG. 11 is a diagram illustrating a ninth embodiment of the present invention.

FIG. 11 is a diagram showing a ninth embodiment of the present invention. Referring to FIG. 11, a fabric member 43 is embedded inside the holder 12. The fabric member 43 serves as a brake by pressing the bevels 102 of the wheel 10. The fabric member 43 thus generates a force to oppose rotation of the wheel 10, so that the wheel 10 can perform scribing in a stable manner.

Referring to FIG. 11, inside the holder 12, movement of the fabric member 43 is restrained by a holding pin 431. The fabric member 43 may be made of, for example, nonwoven fabric like cotton.

Tenth Embodiment

Figure 12:
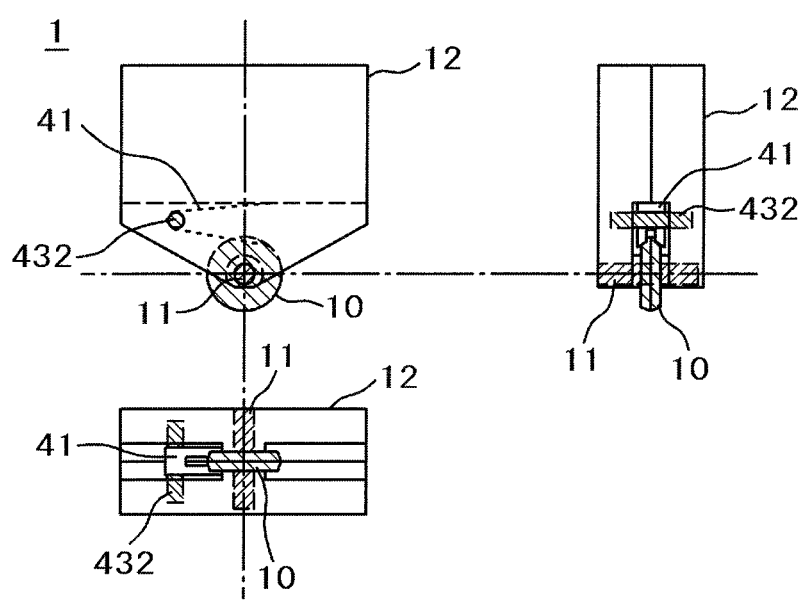
FIG. 12 is a diagram illustrating a tenth embodiment of the present invention.

FIG. 12 is a diagram showing a tenth embodiment of the present invention. Referring to FIG. 12, a plate spring 41 is disposed inside the holder 12. The plate spring 41 serves as a brake by pressing the bevels 102 of the wheel 10. The plate spring 41 thus generates a force to oppose rotation of the wheel 10, so that the wheel 10 can perform scribing in a stable manner.

Referring to FIG. 12, the plate spring 41 is bent at a support pin 432. The support pin 432 may be made unnecessary by appropriately changing the shape of the plate spring 41. The plate spring 41 may be formed of, for example, stainless steel. The plate spring 41 presses the bevels 102 of the wheel 10, so that the cutting edge 101 of the wheel 10 is not damaged. A different material, for example, resin may be interposed between the plate spring 41 and the bevels 102 of the wheel 10.

Eleventh Embodiment

Figure 13:
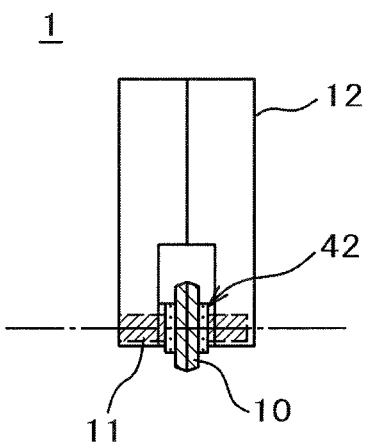
FIG. 13 is a diagram illustrating an eleventh embodiment of the present invention.

FIG. 13 is a diagram showing an eleventh embodiment of the present invention. Referring to FIG. 13, washers 42 are disposed between the wheel 10 and the holder 12. The washers 42 press the sides of the wheel 10 to serve as brakes. Namely, the friction between each of the washers 42 and the wheel 10 generates a force to oppose rotation of the wheel 10, so that the wheel 10 can perform scribing in a stable manner.

Each of the washers 42 is doughnut-shaped and measures, for example, 2 mm in outer diameter, 1 mm in inner diameter, and 5 to 10 micrometers in thickness. It may be made of either plastic or metal.

Twelfth Embodiment

Figure 14:
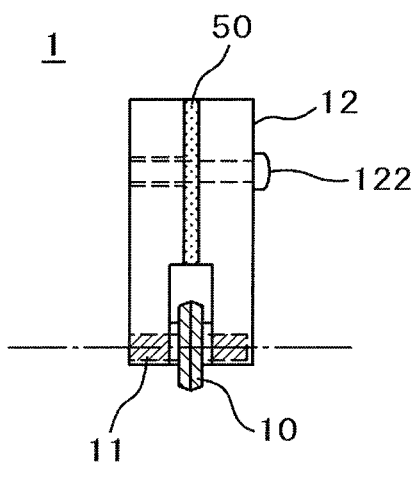
FIG. 14 is a diagram illustrating a twelfth embodiment of the present invention.

FIG. 14 is a diagram showing a twelfth embodiment of the present invention. Referring to FIG. 14, an elastic spacer 50 is sandwiched between the two holder parts. The holder 12 is formed by clamping the two holder parts, sandwiching the elastic spacer 50, with a clamping screw 122.

The wheel 10 is disposed below the holder 12. In the configuration shown in FIG. 14, clamping the two holder parts with the screw 122 causes the wheel 10 to be clamped by the holder 12. Namely, a force to oppose rotation of the wheel 10 is generated by clamping the screw 122.

The presence of the elastic spacer 50 between the two parts of the holder 12 makes it possible to adjust the clamping force applied by the holder 12 to the wheel 10. According to the present embodiment, a force to oppose rotation of the wheel 10 is generated to allow the wheel 10 to perform scribing in a stable manner and the force to oppose rotation of the wheel 10 can be arbitrarily controlled.

Thirteenth Embodiment

Figure 15:
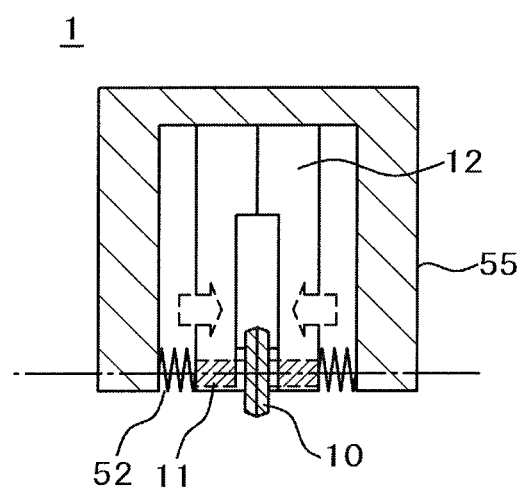
FIG. 15 is a diagram illustrating a thirteenth embodiment of the present invention.

FIG. 15 is a diagram showing a thirteenth embodiment of the present invention. Referring to FIG. 15, a rigid external member 55 is disposed outside the holder 12 with a spring member 52 disposed between the rigid external member 55 and the holder 12 on each side. The spring force of each of the spring members 52 causes the holder 12 to undergo elastic deformation causing the wheel 10 to be pressed by the holder 12. This brakes rotation of the wheel 10. In this configuration, a force to oppose rotation of the wheel 10 is thus generated.

Even though the spring members 52 shown in FIG. 15 are coil springs, they need not necessarily be coil springs. They may be replaced by other elastic bodies. The portion where the spring members (i.e. elastic bodies) are fitted of the holder 12 may be made, as shown in FIG. 9, smaller in width than the remaining portion of the holder 12 so as to make efficient use of the elasticity of the spring members.

Fourteenth Embodiment

Figure 16:
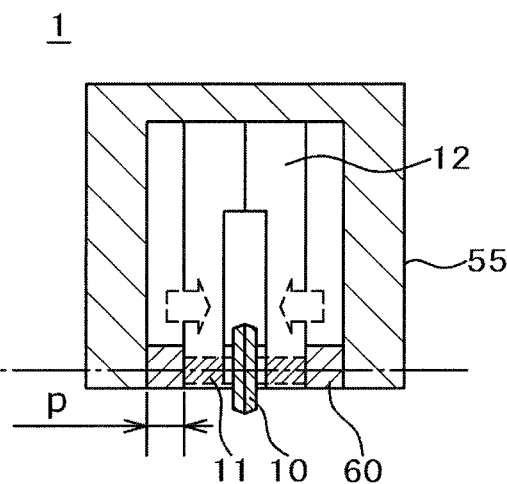
FIG. 16 is a diagram illustrating a fourteenth embodiment of the present invention.

FIG. 16 is a diagram showing a fourteenth embodiment of the present invention. Referring to FIG. 16, the rigid external member 55 is disposed outside the holder 12 with a piezoelectric element 60 disposed between the rigid external member 55 and the holder 12 on each side. In other respects, the configuration of the present embodiment is the same as that of the thirteenth embodiment of the present invention. When a voltage is applied to each of the piezoelectric elements 60, thickness p of each of the piezoelectric elements changes. For example, when a voltage is applied across each of the piezoelectric elements 60 causing thickness p of each of the piezoelectric elements 60 to increase, the holder 12 is pressed inwardly to brake the wheel 10.

Namely, applying a voltage across each of the piezoelectric elements 60 generates a force to oppose rotation of the wheel 10, so that the wheel 10 can perform scribing in a stable manner. According to the present embodiment, the force to oppose rotation of the wheel 10 can be controlled by controlling the voltage applied to the piezoelectric elements 60. This makes it easy to set conditions for scribing according to the condition of the mother substrate to be scribed.

Fifteenth Embodiment

Figure 17:
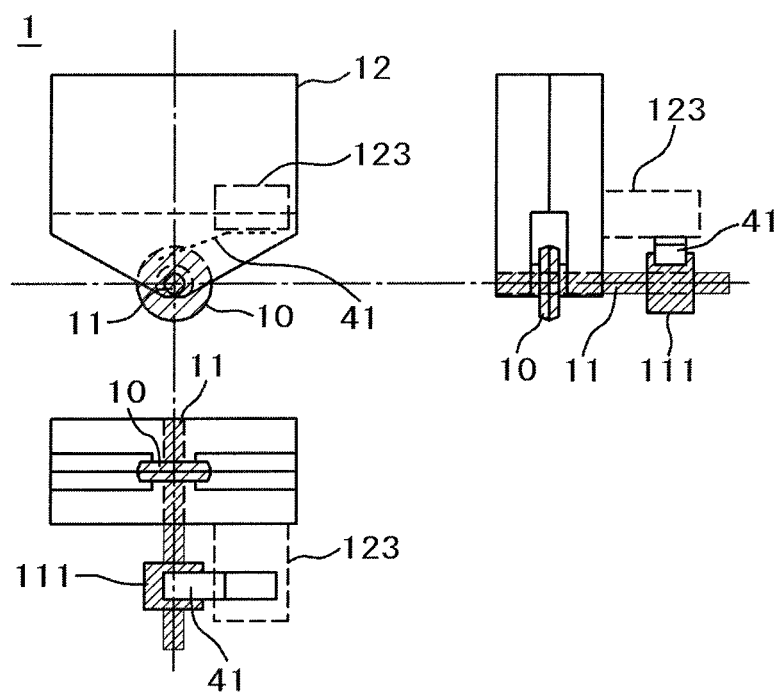
FIG. 17 is a diagram illustrating a fifteenth embodiment of the present invention.

In the first to fourteenth embodiments, the wheel 10 is not restrained by the wheel pin 11 and is freely rotatable about the wheel pin 11. In a fifteenth embodiment shown in FIG. 17 of the present invention, the wheel 10 and the wheel pin 11 are united. As shown in FIG. 17, the wheel pin 11 extends to outside the holder 12. The holder 12 has a support rod 123 with a plate spring 41 disposed between the wheel pin 11 extending to outside the holder 12 and the support rod 123.

A cylindrical member 111 is mounted on the portion outside the holder 12 of the wheel pin 11. When the cylindrical member 111 is pressed by the plate spring 41, the cylindrical member 111 presses the wheel pin 11 to brake rotation of the wheel pin 11. Since, in the present embodiment, the wheel pin 11 and the wheel 10 are united, braking the wheel pin 11 brakes the wheel 10. A force to oppose rotation of the wheel 10 is thus generated so as to allow the wheel 10 to perform scribing in a stable manner.

Sixteenth Embodiment

Figure 18:
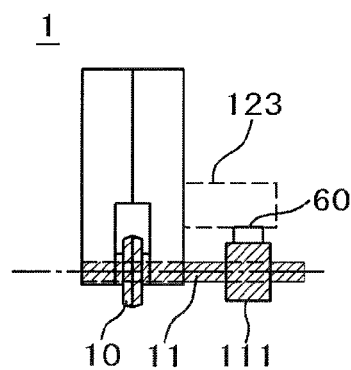
FIG. 18 is a diagram illustrating a sixteenth embodiment of the present invention.

FIG. 18 is a diagram showing a sixteenth embodiment of the present invention. In this embodiment, too, the wheel 10 and the wheel pin 11 are united. The configuration shown in FIG. 18 differs from that shown in FIG. 17 in that, instead of the plate spring 41, a piezoelectric element 60 is disposed between the support rod 123 and the cylindrical member 111 of the wheel 11. In other respects, the configuration shown in FIG. 18 is the same as that shown in FIG. 17.

In the configuration shown in FIG. 18, applying a voltage across the piezoelectric element 60 brakes the cylindrical member 111 and eventually the wheel pin 11. Thus, a force to oppose rotation of the wheel 10 is generated in the configuration of the present embodiment with the wheel pin 11 and the wheel 10 united. In the present embodiment, the force to oppose rotation of the wheel 10 can be easily adjusted by adjusting the voltage applied across the piezoelectric element 60.

Seventeenth Embodiment

Figure 19:
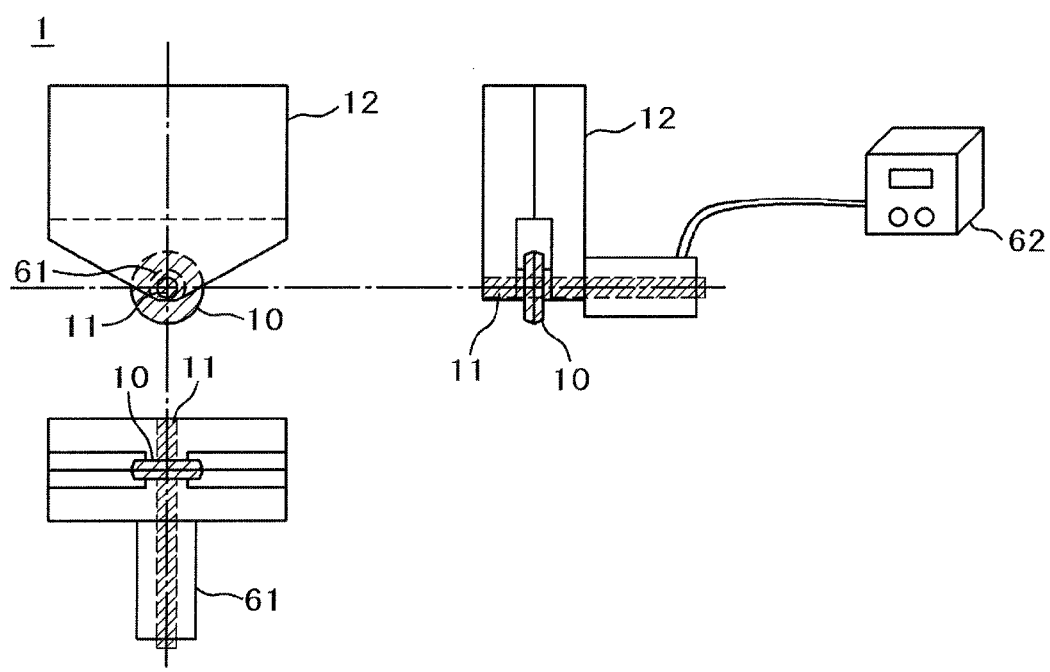
FIG. 19 is a diagram illustrating a seventeenth embodiment of the present invention.

FIG. 19 is a diagram showing a seventeenth embodiment of the present invention. In this embodiment, too, the wheel 10 and the wheel pin 11 are united. Referring to FIG. 19, an electromagnetic brake 61 is attached to the portion extending outside the holder 12 of the wheel pin 11. The electromagnetic brake 61 is controlled by a control power supply 62. The electromagnetic brake 61 may be, for example, something like a motor.

With the wheel 10 united with the wheel pin 11, a force generated by the electromagnetic brake 61 to oppose rotation of the wheel 10 is directly applied to the wheel 10. Thus, in the present embodiment, the wheel 10 is directly braked by the electromagnetic brake 61, so that the force to oppose rotation of the wheel 10 can be accurately controlled.

Eighteenth Embodiment

Figure 20:
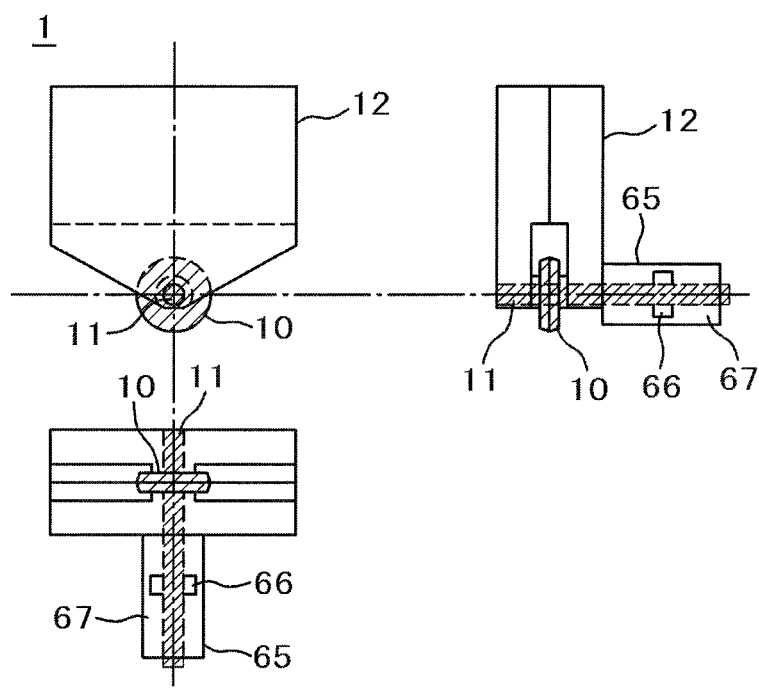
FIG. 20 is a diagram illustrating an eighteenth embodiment of the present invention.

FIG. 20 is a drawing showing an eighteenth embodiment of the present invention. In this embodiment, too, the wheel 10 and the wheel pin 11 are united. Referring to FIG. 20, a fluid brake 65 is attached to the portion extending outside the holder 12 of the wheel pin 11. The fluid brake 65 is internally filled with a fluid 67 such as oil. The wheel pin 11 extends, outside the holder 12, through the fluid brake 65. The portion extending inside the fluid brake 65 of the wheel pin 11 has a propeller 65 or something like that so as to brake rotation of the wheel pin 11.

Thus, a force to oppose rotation of the wheel 10 united with the wheel pin 11 is generated by the fluid brake 65 and is applied to the wheel 10, so that the wheel 10 can perform scribing in a stable manner.

Nineteenth Embodiment

Figure 21:
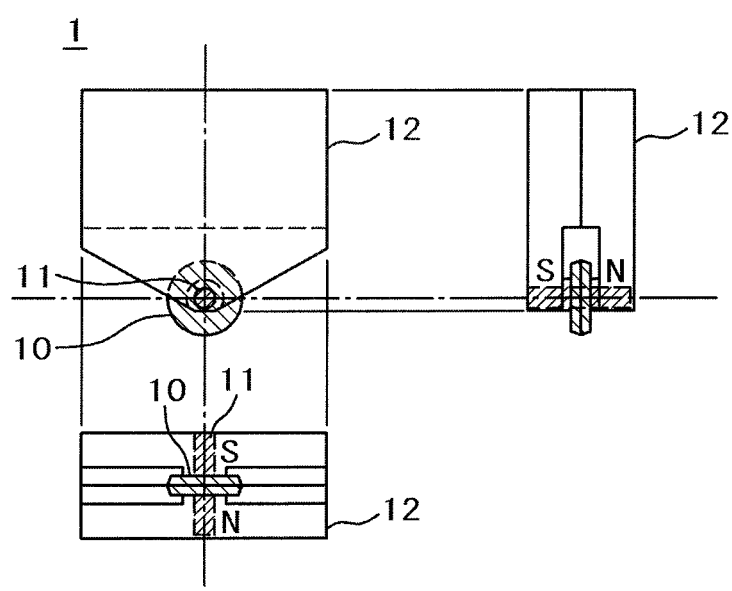
FIG. 21 is a diagram illustrating a nineteenth embodiment of the present invention.
Figure 22:
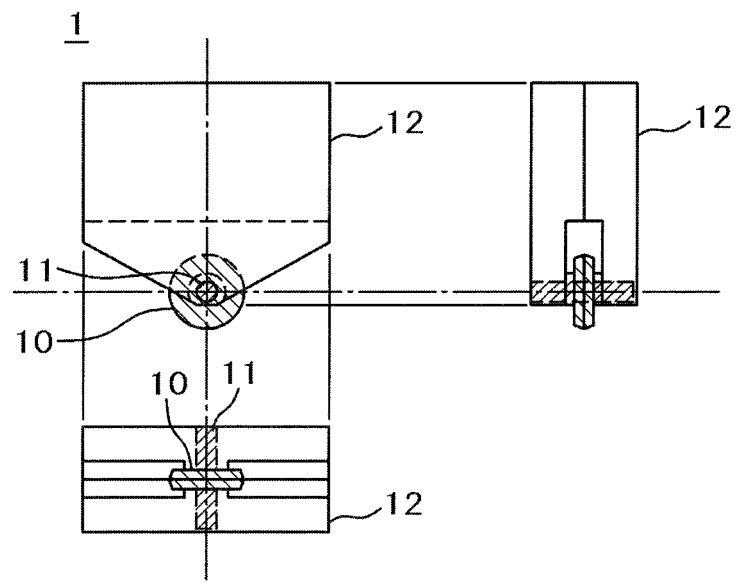
FIG. 22 is a diagram illustrating an existing glass cutter.
Figure 23:
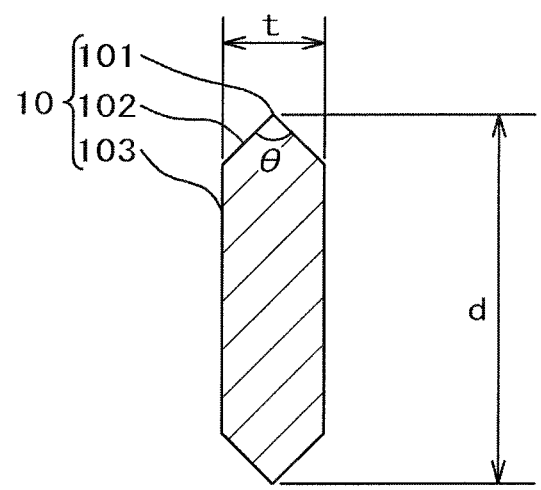
FIG. 23 is a sectional view of a wheel 10.
Figure 24A:
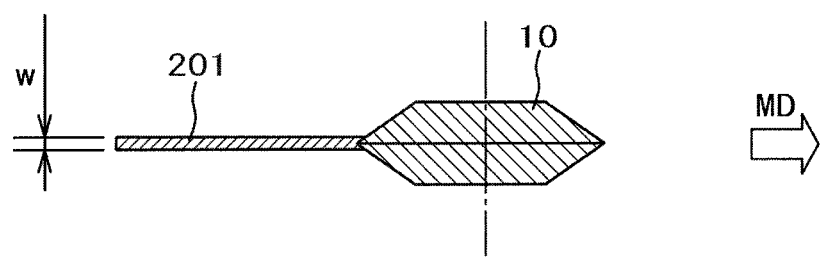
FIGS. 24A and 24B are diagrams illustrating scribing by the wheel 10.
Figure 24B:
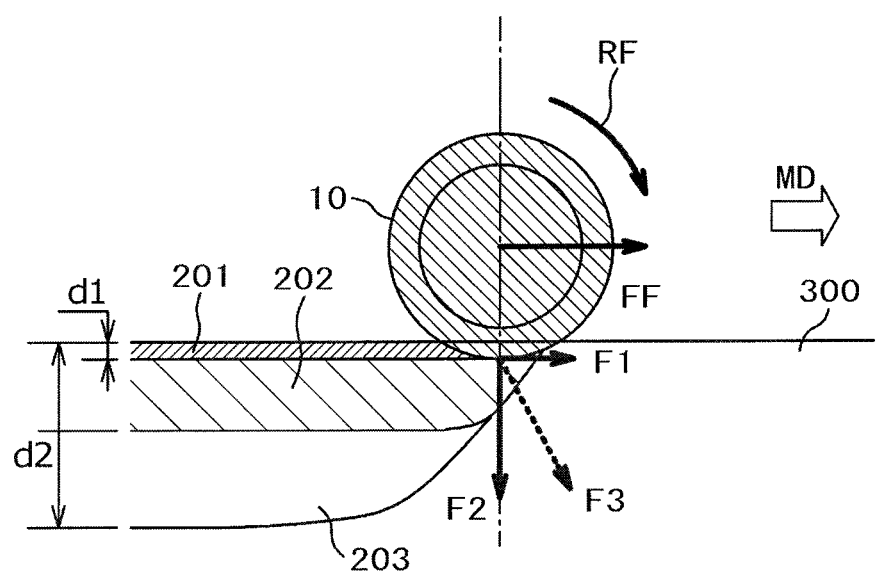
Figure 25A:
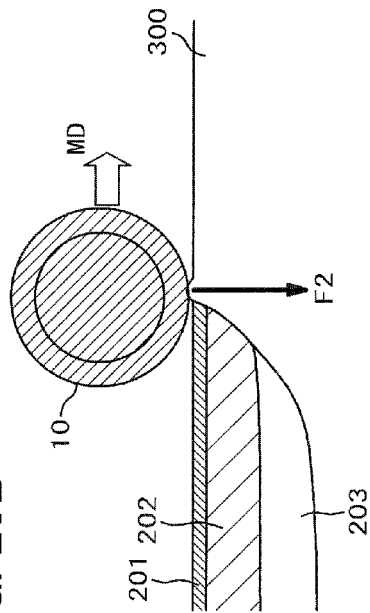
FIG. 25A to 25D are diagrams illustrating a problem with scribing performed using prior-art technology.
Figure 25B:
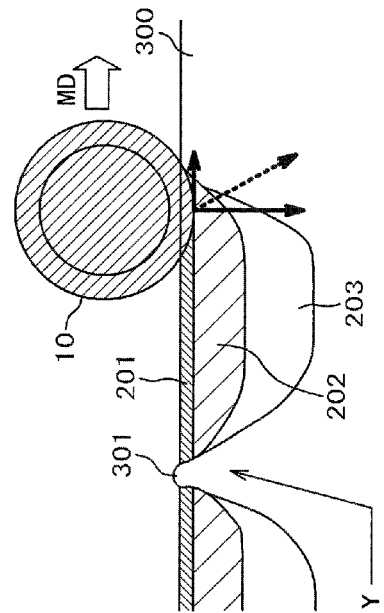
Figure 25C:
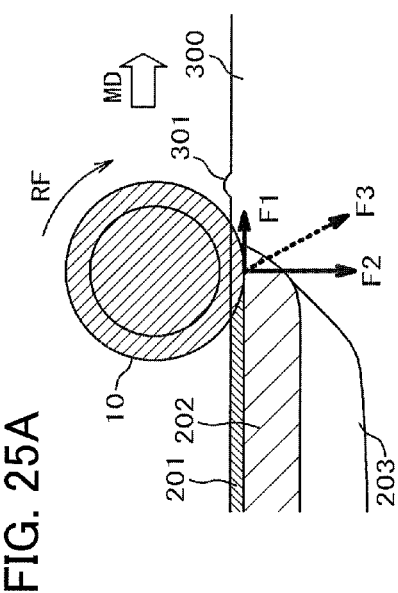
Figure 25D:
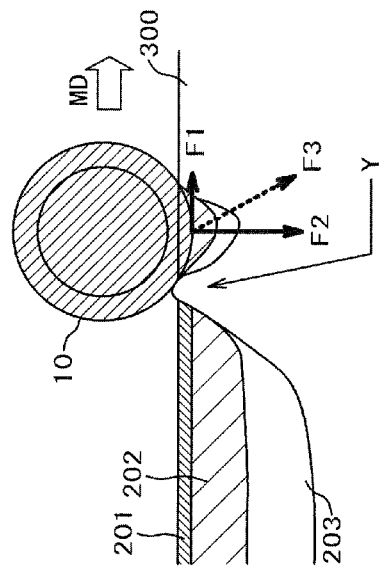
Figure 26A:
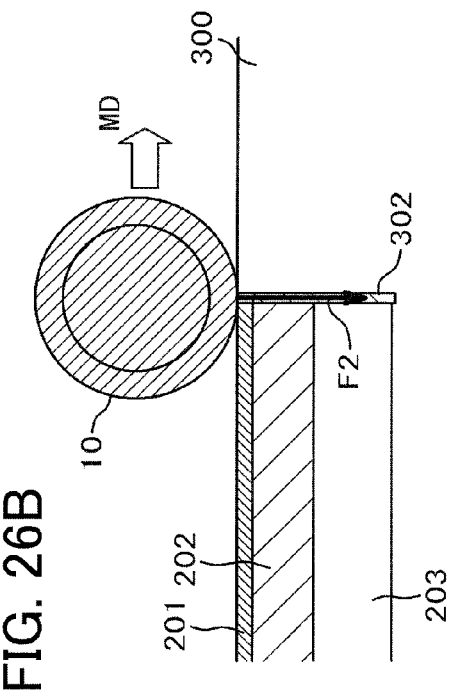
FIG. 26A to 26D are diagrams illustrating another problem with scribing performed using prior-art technology.
Figure 26B:
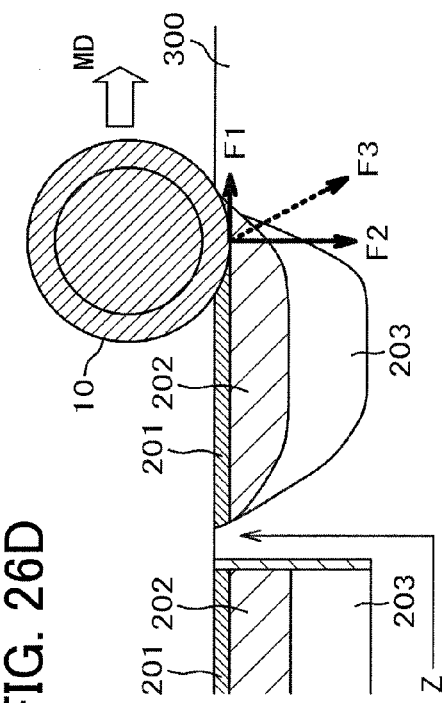
Figure 26C:
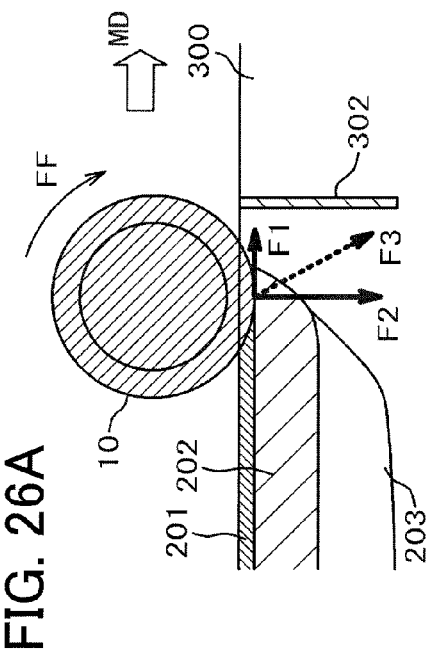
Figure 26D:
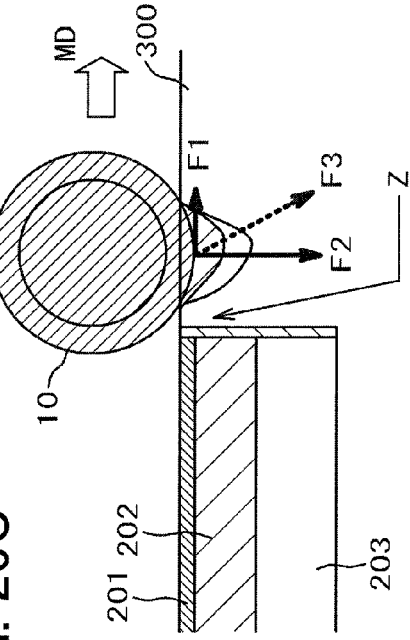

FIG. 21 is a diagram showing a nineteen embodiment of the present invention. In this embodiment, the wheel 10 and the wheel pin 11 are not united. In this embodiment, a magnetized holder 12 is used to press the wheel 10 against a side of the holder 12 to thereby generate a force to oppose rotation of the wheel 10.

The holder 12 formed of tool steel which is a magnetic material can be magnetized. Referring to FIG. 21, the holder 12 serves as a horseshoe-shaped magnet 20 with one end being a north pole and the other end being a south pole. The wheel 10 and the wheel pin 11 are disposed between the north and south poles. The flux density between the north and south poles in FIG. 21 is 3 mT (millitesla), i.e. not lower than 30 Gauss. This level of flux density is high enough to press the wheel 10 against the holder 12. Thus, a force to oppose rotation of the wheel 10 can be generated.

As described above, according to the present embodiment, the wheel 10 can scribe glass in a stable manner without requiring any additional part to be provided for the holder 12.

What is claimed is:

1. A glass cutting method for moving, on glass, a wheel having a cutting edge on an outer circumference thereof while pressing the wheel against the glass causing the wheel to rotate in a first direction and forming a fracture layer on the glass, and applying a force on the wheel directed in the opposite direction of the first direction of rotation of the wheel,
    wherein glass is cut by forming a scribe line thereon using the wheel, and
    wherein the force on the wheel directed in the opposite direction of the first direction of rotation is applied when the wheel rotates in the first direction
    wherein a wheel pin supports the wheel,
    wherein a holder supports the wheel pin, the holder comprising:
        a top surface where the wheel is disposed;
        two inclined surfaces;
        three mutually perpendicular flat surfaces;
        a first magnet disposed on one of the two inclined surfaces; and
        a second magnet disposed on the other of the two inclined surfaces, and
        wherein the first and second magnets generate a magnetic flux forming a magnetic field to press the wheel against the holder, and
    further comprising generating with the first magnet and second magnet a magnetic flux perpendicular to a side surface of the wheel.

2. A glass cutting method for moving, on glass, a wheel having a cutting edge on an outer circumference thereof while pressing the wheel against the glass causing the wheel to rotate in a first direction and forming a fracture layer on the glass, and applying a force on the wheel directed in the opposite direction of the first direction of rotation of the wheel,
    wherein glass is cut by forming a scribe line thereon using the wheel, and
    wherein the force on the wheel directed in the opposite direction of the first direction of rotation is applied when the wheel rotates in the first direction
    wherein a wheel pin supports the wheel,
    wherein a holder supports the wheel pin, the holder comprising:
        a top surface where the wheel is disposed;
        two inclined surfaces;
        three mutually perpendicular flat surfaces;
        a first magnet disposed on one of the two inclined surfaces; and
        a second magnet disposed on the other of the two inclined surfaces, and
        wherein the first and second magnets generate a magnetic flux forming a magnetic field to press the wheel against the holder, and
    further comprising generating with the first magnet and second magnet a magnetic flux concentrated in an upper portion of the wheel.

3. The glass cutting method according to claims 1, wherein the poles of the first magnetic and the poles of the second magnetic are arranged along the wheel pin.

4. The glass cutting method according to claims 2, wherein the poles of the first magnetic and the poles of the second magnetic are arranged along the wheel pin.

5. A glass cutter having a wheel for forming a fracture layer on glass, a wheel pin supporting the wheel, and a holder supporting the wheel pin, the holder comprising a top surface where the wheel is disposed, two inclined surfaces, and three mutually perpendicular flat surfaces,
    wherein a mechanism for opposing rotation of the wheel when the wheel rotates is provided, the mechanism for opposing rotation of the wheel comprising a first magnet disposed on one of the two inclined surfaces of the holder and a second magnet disposed on the other of the two inclined surfaces of the holder,
    wherein the first and second magnets generate a magnetic flux forming a magnetic field to press the wheel against the holder,
    wherein the wheel comprises a side surface, and
    wherein the magnetic flux is perpendicular to the side surface of the wheel.

6. A glass cutter having a wheel for forming a fracture layer on glass, a wheel pin supporting the wheel, and a holder supporting the wheel pin, the holder comprising a top surface where the wheel is disposed, two inclined surfaces, and three mutually perpendicular flat surfaces,
    wherein a mechanism for opposing rotation of the wheel when the wheel rotates is provided, the mechanism for opposing rotation of the wheel comprising a first magnet disposed on one of the two inclined surfaces of the holder and a second magnet disposed on the other of the two inclined surfaces of the holder,
    wherein the first and second magnets generate a magnetic flux forming a magnetic field to press the wheel against the holder, and
    wherein the magnetic flux is concentrated in an upper portion of the wheel.

7. The glass cutter according to claim 5, wherein the poles of the first magnetic and the poles of the second magnetic are arranged along the wheel pin.

8. The glass cutter according to claim 6, wherein the poles of the first magnetic and the poles of the second magnetic are arranged along the wheel pin.

* * * * *